May 5, 1959  L. W. STAHL  2,884,965
WORKPIECE POSITIONING DEVICE
Filed March 19, 1957

INVENTOR.
LESLIE W. STAHL
BY
*Fearman & Fearman*
ATTORNEYS

United States Patent Office 2,884,965
Patented May 5, 1959

2,884,965

WORKPIECE POSITIONING DEVICE

Leslie W. Stahl, Saginaw, Mich.

Application March 19, 1957, Serial No. 647,042

3 Claims. (Cl. 143—174)

This invention relates to apparatus for use in positioning a workpiece relatively to the saw blade of a bench saw and more particularly the invention pertains to a work positioning device attachable to existing bench saw parts and being operable to locate a workpiece with extreme accuracy for presentation to the saw blade.

Bench saw constructions of the kind with which the invention is adapted particularly for use customarily include a table through which a saw blade projects so that relative movement of a workpiece supported on the table and the saw blade will enable selected lengths to be cut from the workpiece. Bench saws of this kind usually include a bar against which the workpiece may be held during sawing operations. In using such a bench saw, it is desirable that some form of locating means be associated with the bar and against which one end of the workpiece may be placed so as to enable a plurality of successive workpieces to be cut to identical length. It also is desirable that the locating means be quickly and easily adjustable relatively to the bar so as to permit a variety of lengths to be cut. Moreover, because of the difficulty in making a quick and accurate initial adjustment of such locating means, it is preferable that the latter include means for clamping it in a position of rough adjustment and other means for making fine adjustments.

An object of this invention is to provide workpiece positioning apparatus adapted for connection to a part of a bench saw construction for locating a workpiece with extreme accuracy relative to a saw blade.

Another object of the invention is to provide workpiece positioning apparatus of the kind referred to which is quickly movable to a position of rough adjustment and then movable to a selected position of fine adjustment relative to the saw blade.

A further object of the invention is to provide workpiece positioning apparatus adapted for use on conventional bench saws without requiring modification of either the bench saw or the positioning apparatus.

A still further object of the invention is to provide workpiece positioning apparatus for use in conjunction with a bench saw and which will not interfere with the operating parts of the bench saw.

Still a further object of the invention is to provide apparatus of the kind referred to which is simple in construction, economical to manufacture, and durable in use.

Other objects and advantages of the invention will become apparent from the following description when it is considered in conjunction with the appended claims and the accompanying drawings in which:

Figure 1:
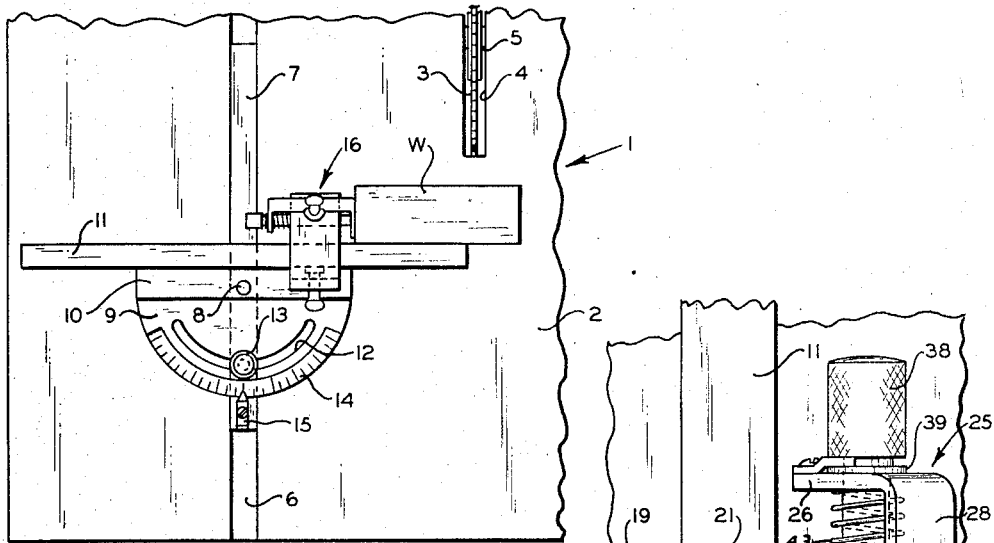
Figure 1 is a fragmentray, top plan view of a bench saw equipped with apparatus constructed in accordance with the invention.
Figure 3:
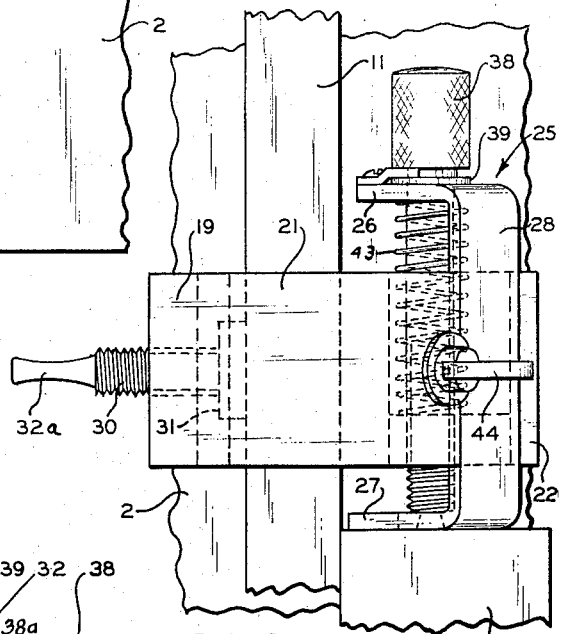
Figure 3 is a fragmentary enlarged, top plan view of the apparatus shown in Figure 2.
Figure 4:
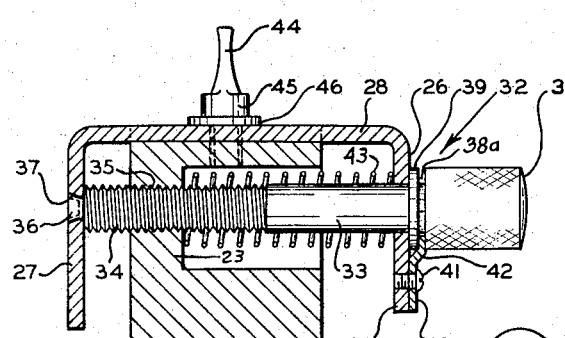
Figure 4 is a sectional view taken on the line 4—4 of Figure 2.

An illustrative bench saw is disclosed in the drawings and designated generally by the reference character 1. The saw construction 1 is conventional and includes a table 2 having a flat upper surface above which a saw blade 3 projects, the blade 3 extending through an opening 4 in the table and being fixed to a shaft 5 which is journalled in bearings (not shown) supported by the table and driven by a suitable motor (not shown). In the illustrative construction, the table 2 has a groove 6 formed in its upper surface which is spaced from, but parallel to, the plane of the saw blade 3. Mounted in the groove for sliding movements to and fro is a cut-off guide bar 7 to which is pivotally connected as at 8 a protractor type bracket 9 on which is rigidly secured a mounting flange 10 that is adapted for connection in a suitable manner, such as by screws (not shown) to a bar 11 against which a workpiece W may be supported in a manner yet to be described. The bracket 9 has an arcuate slot 12 through which extends a clamping element 13 that may be manipulated to fix the bracket 9 and the supporting bar 11 in any one of a number of angular positions relative to the guide bar 7. The edge of the bracket 9 may have a scale 14 inscribed thereon and adapted to be read in conjunction with a pointer 15 fixed on the guide bar 7 to determine the angular relation between the guide bars 7 and 11. In the disclosed embodiment, the bars 7 and 11 are disposed at right angles to each other so that the bar 11 extends toward the plane of the saw blade 3 and at right angles thereto. The bar 11 terminates just short of the plane of the saw blade 3 so that relative movement between the bar 11 and the blade 3 may be effected without interference.

Work positioning apparatus constructed in accordance with the principles of the invention is represented generally by the reference character 16 and comprises a body member 17 preferably formed as a casting and including front and rear walls or legs 18 and 19, respectively, spaced from one another by an opening 20 and being connected at their upper ends by a top wall 21. Integrally joined to the front wall 18 and projecting forwardly and downwardly from the top wall 21 is a mounting plate or leg 22 having a web 23 at one side joining the plate 22 with the front wall 18. The upper surface of the plate 22 is provided with a groove 24 therein in which is slidably mounted a substantially U-shaped workpiece engaging member 25 composed of a pair of spaced, parallel arms 26 and 27 interconnected at corresponding ends by a crossbar 28.

To mount the apparatus 16 for use, the body 17 is placed in such position relatively to the bar 11 that the latter may be received in the opening 20 between the walls 18 and 19. The rear wall 19 of the body is provided with a threaded opening 29 through which extends a correspondingly threaded screw 30 having a clamping block 31 swivelably mounted at one end for engagement with the bar 11 and a head 32a at its other end to facilitate turning of the screw to clamp the body 17 to the bar 11.

Means for adjusting the position of the workpiece engaging member 25 relatively to the body 17 comprises a screw member 32 having a portion of its shank 33 threaded as at 34 and received in a threaded opening 35 formed in the web 23 between the parts 22 and 18. One end of the shank 33 extends through an opening formed in the arm 26 and the other end of the shank 33 is provided with a substantially frusto-conical extension 36 which is rotatably received in a correspondingly shaped opening 37 formed in the arm 27. The connection of the screw member 32 to the arm 27 is such that the screw is rotatable relatively to the arm 27, but is precluded from inadvertent separation from the latter. The end of the shank which extends through the arm 26 is provided with a knurled head 38, by means of which the screw may be rotated.

The screw head 38 is peripherally slotted as at 38a to provide an annular part 39 which surrounds the shank 33 outboard of the arm 26 and lies closely adjacent to the latter. A keeper member 40, which may be secured to the leg 26 by means of a screw 41, includes an offset extension 42 which lies between the head 38 and the part 39 without, however, interfering with rotation of the screw 32. A compression spring 43 surrounds the shank 33 of the screw and reacts against the inboard surface of the arm 26 and the web 23 to take up any "play" which might otherwise exist because of imperfect matching of the threads of the screw 32 in the opening 35.

When the body 17 has been clamped to the bar 11 in the manner previously described, the work engaging member 25 may be adjusted along a path parallel to the bar 11 by manipulation of the screw 32. The member 25 may be clamped in adjusted position by a bolt 44 having a shoulder 45 which bears against a washer 46 which, in turn, clamps against the cross bar 28.

Figure 2:
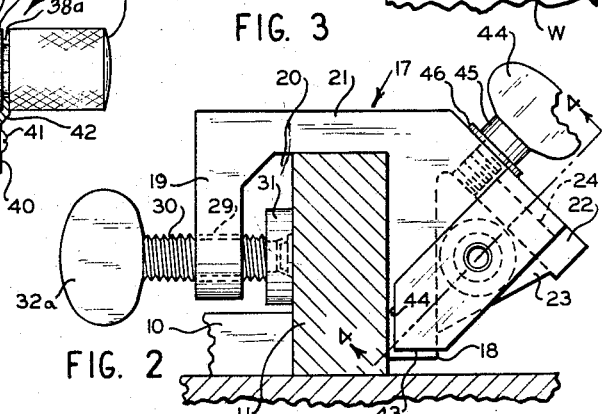
Figure 2 is an enlarged view, partly in section and partly in side elevation of a portion of the apparatus shown in Figure 1.

Referring now particularly to Figure 2, it is preferred that the leg 18 be of a length less than the height of the supporting bar 11 and that the leg 19 be of such length that it lies above the part 10 so as to preclude any possibility of interference between the legs 18 and 19 and the other parts of the bench saw. Moreover, it is preferred that the workpiece contacting arm 27 be beveled as at 43 and 44 to assure clearance between the arm 27 and the table 2 and between the arm 27 and the bar 11 so as to preclude the likelihood of interference between these parts.

In operation, the bar 11 is set at a selected angle to the plane of the saw blade 3 by means of the protractor-like bracket 9 and the body member 17 is clamped to a bar 11 in a position of rough adjustment by means of the clamping screw 30 and the block 31. Thereafter, the adjusting means 32 may be manipulated to locate the workpiece contacting arm 27 in a position of precise adjustment relative to the plane of the saw blade. A workpiece W then may be placed in position against the bar 11 and the arm 27 and presented to the saw blade 3 to cut from the piece W a predetermined portion of its length. Subsequent workpieces may be substituted for the piece W and each finished piece will be of identical length. When using the disclosed apparatus, however, it is necessary to determine the proper location of the apparatus 16 only once as long as it is desired to produce cut pieces of uniform length.

Apparatus constructed in accordance with the invention is shown in combination with a bench saw of such construction that the workpiece is moved with respect to the blade. The apparatus is equally capable of use with other types of bench saws, however, one example being the kind where the workpiece remains stationary and the saw blade is moved. This disclosure, therefore, is intended to be illustrative of the invention rather than definitive thereof. The invention is defined in the claims.

I claim:

1. Workpiece positioning apparatus for use in conjunction with a bench saw including a saw blade and a workpiece supporting bar movable relatively to said saw blade to cut a workpiece, said apparatus comprising a body member having an opening therein for reception of said supporting bar; means mounted on said body member for releasably clamping the latter in a selected position of rough adjustment on said supporting bar; a substantially U-shaped workpiece locating member having a cross-bar slidably supported on said body member and having a pair of spaced, substantially parallel arms one of which is located on one side of said body member in a position to engage a workpiece supported by said supporting bar and the other of which is located on the other side of said body member; adjusting means interconnecting said locating member and said body member operable to effect sliding movement of said locating member to a selected position of fine adjustment of the workpiece engageable arm, said adjusting means comprising a threaded screw member having a freely rotatable connection with each of said arms and a threaded connection with said body member; and spring means reacting between said body member and one of said arms and constantly exerting a force on said locating member to prevent inadvertent relative movement of said body member and said locating member.

2. Apparatus as set forth in claim 1 wherein one end of said screw member is provided with a peripheral groove and wherein one of said arms carries a part which lies in said groove, said part and said spring means co-operating upon rotation of said screw member in one direction to effect movement of said locating member relative to said body member.

3. Apparatus as set forth in claim 1 including clamping means mounted on said body member for releasable clamping engagement with said cross-bar to clamp said locating member in a selected position of fine adjustment relative to said supporting bar.

References Cited in the file of this patent

UNITED STATES PATENTS

| | | |
|---|---|---|
| 305,563 | Baer | Sept. 23, 1884 |
| 1,273,235 | Lamphere | July 23, 1918 |
| 1,485,149 | Renken | Feb. 26, 1924 |
| 2,463,438 | Steiner | Mar. 1, 1949 |
| 2,777,485 | Farrow | Jan. 15, 1957 |
| 2,787,301 | Anderson | Apr. 2, 1957 |

FOREIGN PATENTS

| | | |
|---|---|---|
| 454,851 | Great Britain | Oct. 5, 1936 |